United States Patent [19]

Cummings

[11] 3,711,857
[45] Jan. 16, 1973

[54] CAPTURE EFFECT SYSTEM
[75] Inventor: William C. Cummings, Annandale, Va.
[73] Assignee: Scanwell Laboratories, Incorporated, Springfield, Va.
[22] Filed: April 7, 1971
[21] Appl. No.: 131,946

[52] U.S. Cl. ............................343/107, 343/109
[51] Int. Cl. ..................................G01s 1/16
[58] Field of Search..........................343/107, 109

[56] References Cited

UNITED STATES PATENTS 3,283,326  11/1966  Watts, Jr. .........................343/107

Primary Examiner—Benjamin A. Borchelt
Assistant Examiner—Richard E. Berger
Attorney—Sandoe, Hopgood & Calimafde

[57] ABSTRACT

A capture effect antenna system in which the course and clearance signals are transmitted from a single antenna array. The clearance carrier signal has a substantial null along the course centerline, to thereby cause significant reduction in the course bends.

7 Claims, 4 Drawing Figures

CAPTURE EFFECT SYSTEM

The present invention relates generally to antennas, and more particularly to a capture effect antenna system for use in an instrumentation landing system of runway localizer.

One of the major factors in increasing the safety of flying, particularly in adverse weather conditions, has been the development of sophisticated instrument landing systems for use in safely guiding a landing aircraft onto the landing field or runway even when the runway is not readily visible to the pilot.

In a conventional capture effect system a pair of transmitters located at the airfield respectively transmit course and clearance signals. The former is a relatively narrow, high amplitude signal centered along the course center line. The clearance signal includes carrier and sideband components which are relatively wide beam, overlap the course signal, and extend to either side of the course centerline.

The course carrier and sideband signals are modulated at 90 Hz and 150 Hz. The phase between the clearance sideband and carrier signals is established such that when the aircraft is approaching the runway from one side of the course line, the 90 Hz components of the clearance sideband and carrier reinforce, and the 150 Hz components cancel; when the aircraft is approaching the runway from the other side of the course line, the 90 Hz clearance signal components cancel, and the 150 Hz signals reinforce.

The aircraft is provided with a receiver and an indicator, the former being tuned to receive the localizer signals. When the aircraft is off course, the receiver responds to the clearance signals and the indicator points either left or right depending on which of the 90 and 150 Hz modulating signal is stronger. Once the airplane is guided on course, the receiver is then captured by the course signal and is insensitive to the clearance signal so long as it remains on course. The pilot then follows the captured course signal until a safe landing is accomplished.

In the conventional instrumentation landing system localizer the clearance carrier amplitude along the course line is of a significant amplitude and may be conventionally one-third the amplitude of the course signal along the course centerline. This factor, as will be described in greater detail in a later part of the application, is one of the major factors that tend to introduce course bends which are produced by the reflection back onto the course of the transmitted clearance signals from hangars, hills, buildings and other natural or man-made objects that may be located at the airport site at either side of the landing runway.

The reflected signals consist primarily of the clearance carrier and sideband signals and may be received by the aircraft localizer receiver along with the course or direct signal, to thereby produce an incorrect fly left or fly right indication given by the cross-pointer. This incorrect indication may cause the pilot to fly the aircraft off course, which occurrence may have serious and even tragic consequences. The amplitude and direction of this incorrect indication is a function of the relative amplitudes and phases of the reflected clearance and the direct or course signals.

Several systems have been developed that were directed at reducing the effect of course bends, such as the system disclosed in U.S. Pat. No. 3,283,326 to Chester Watts and assigned to the assignee of the present invention. While these systems have been partially successful in achieving their desired result, the presently employed systems still experience serious difficulties as a result of the production of significantly large course bends that are detrimental to the accuracy and reliability of the landing system. In addition, most of the known localizers, as noted above, require the use of two separate antenna arrays for transmitting clearance and course signals.

It is therefore an object of the invention to provide a capture effect antenna system in which a single array is employed to transmit both the course and clearance signals.

It is a significant object of the invention to provide a capture effect antenna system in which the effects of course bends are significantly reduced and minimized.

It is a further object of the invention to provide a capture effect system of the type described in which only a relatively low percentage of course and clearance sideband power need be dumped.

To these ends, the capture effect antenna of the present invention comprises a single antenna array which transmits both course and sideband signals. Significantly, the radiation pattern produced by the antenna has a substantial null of its clearance carrier along the course centerline as well as a clearance sideband null. This in turn results, as will be shown more specifically below, in a reduction of the effect of course bends by a factor of nearly three as compared to the presently employed capture effect systems. The combination of the clearance and course signals in a single transmitter array having the desired radiation pattern is achieved in the antenna system of the invention by a combining network including a plurality of simple broadband bridges or hybrid mixers, which combines the course and clearance signals and applies them to selected elements of the transmitting antenna array. The course sideband and carrier signals are applied in predetermined relative amplitudes to other elements of the array to achieve the desired course signal radiation pattern centered primarily along the course centerline.

To the accomplishment of the above and to such further objects as may hereinafter appear, the present invention relates to a capture effect system, substantially as defined in the appended claims and as described in the following specification taken together with the accompanying drawings in which:

FIG. 1 schematically illustrates an airport landing field showing a typical cause of course bends;

The capture effect antenna system of the present invention provides a significant reduction in the production of course bends which, as described above, may produce an incorrect fly left or fly right indication of the cross-pointer located in the cockpit of the aircraft being landed under the control of the system.

Figure 1:
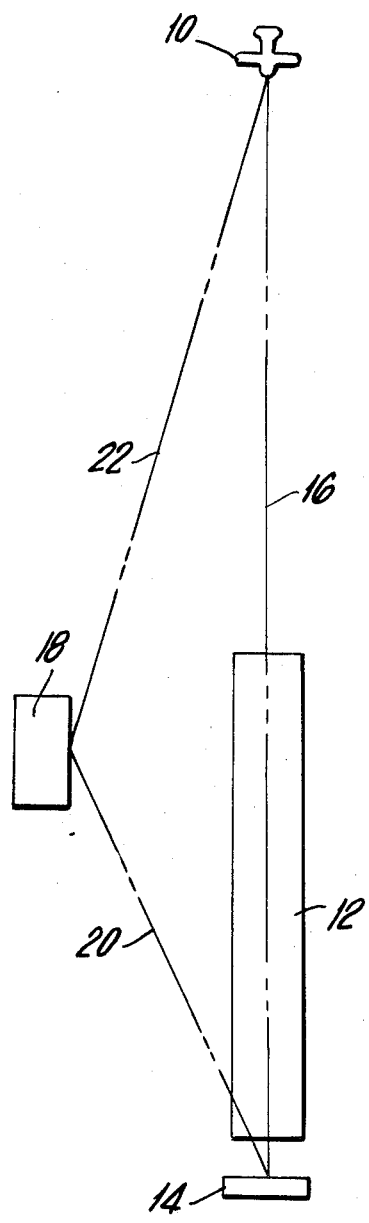

FIG. 1 shows an aircraft 10 approaching a runway 12 under the control of a localizer 14. As shown, the aircraft is approaching the runway along a course centerline 16 along which a narrow-beam course or direct signal is primarily directed from the localizer. The localizer also produces a wide-beam clearance signal to either side of the course centerline which is modulated as described above, to provide the pilot in the aircraft with a fly right or fly left indication when the aircraft is to one side of the course centerline. Energy from localizer 14, primarily the clearance signal, may also be incident on an adjacent structure at the airport such as a building 18 located to one side of the runway, the incident clearance signal being indicated at 20 in FIG. 1.

The clearance signal energy incident on building 18 is reflected therefrom as indicated by the reflected signal 22 back onto the course and may be received by the aircraft instrumentation receiver. Since this reflected energy contains clearance sideband energy as well as clearance carrier energy and is received at the aircraft along with the course signal from the localizer, an incorrect and potentially dangerous indication may be produced in the cockpit indicator. The amplitude and phase of this resulting incorrect indication is a factor of the relative amplitudes and phases of the reflected and the direct signals received at the aircraft.

In a conventional capture effect system of the type presently in widespread use in instrument landing systems at airports, the following conditions are generally in effect:

1. The energy incident on the reflecting site (building 18) is entirely clearance array energy; the course array energy being negligible at the angle of the building with respect to the course centerline.
2. The clearance carrier signal is equal to the clearance sideband signal.
3. The signal reflected from building 18 arrives at the aircraft in phase with the direct or on course signal.
4. The ratio of the course carrier and the clearance carrier along the course centerline is 10:1.
5. The amplitude of the reflected signal received at the aircraft is one-eighth the amplitude of the clearance carrier component of the direct or on course signal.

Under these assumed conditions, the suppressed carrier clearance sideband signals modulated at 90 Hz and 150 Hz are respectively:

(1) $$F'90 = \frac{.2}{\sqrt{10}} + .125 \times \frac{.2}{\sqrt{10}} + \frac{.125}{\sqrt{10}} = .111$$

(2) $$F'150 = \frac{.2}{\sqrt{10}} + .125 \times \frac{.2}{\sqrt{10}} - \frac{.125}{\sqrt{10}} = .032$$

The terms in the right-hand side of Equations (1) and (2) respectively represent the direct signal carrier modulation, the reflected signal carrier modulation, and the reflected clearance sideband.

The detected 90 Hz and 150 Hz sidebands under capture effect conditions including the sidebands on the course array carrier are respectively:

$F90 = 0.2 + 1/2 (0.111)^2 = 0.206$ (3)
$F150 = 0.2 + 1/2 (0.032)^2 = 0.2005$ (4)

The resulting difference depth of modulation, DDM is then:

$DDM = F90 - F150 = 0.206 - 0.2005 = 0.0055$ (5)

which in turn produces a 5.5 μamp course bend signal at the aircraft receiver.

Figure 3:
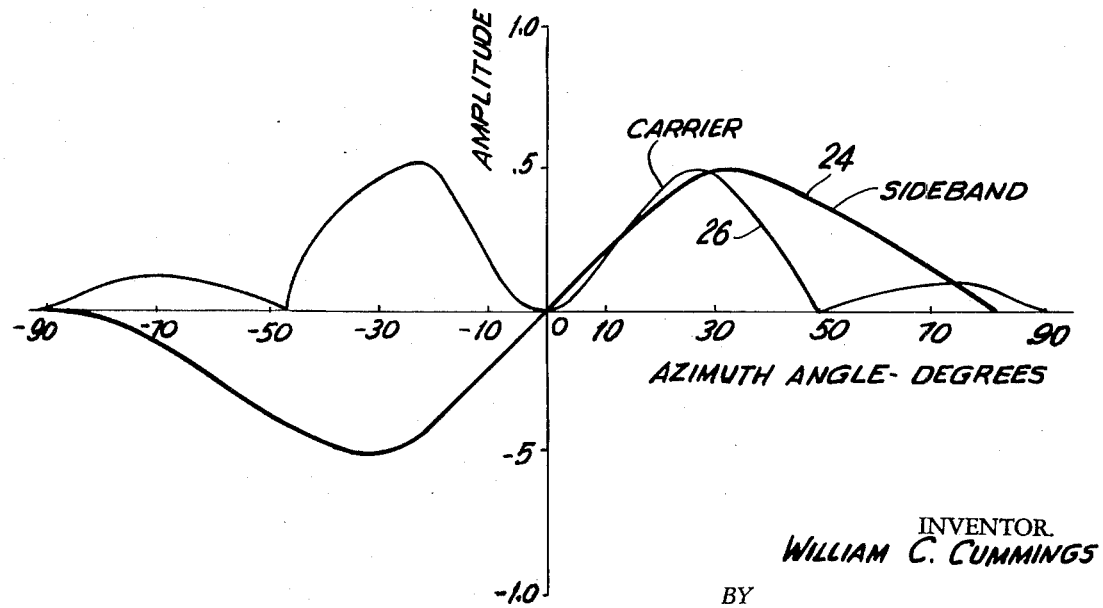
FIG. 3 is a graphical representation of the clearance carrier and sideband radiation pattern produced by the antenna array of FIG. 2.

In the capture effect antenna array of the invention, a clearance signal radiation pattern as shown in FIG. 3 is produced. As is conventional, the clearance sideband signal 24 has a null along the course centerline (0°), and positive and negative peaks at about 30° away from the course centerline. Significantly, however, and in marked contrast to the prior art capture effect antenna arrays, the clearance carrier signal 26 also has a null at the course centerline and positive peaks at slightly below 30° off the course centerline.

The resulting advantages of this clearance signal distribution, particularly with respect to a reduction in the course bends, can now be described.

The sidebands of the clearance signal having the carrier null along the course centerline as shown in FIG. 3 is similar to that in Equations (1) and (2) except that the first term in the right-hand side of those equations representing the on course clearance carrier signal is eliminated so that the value of the sidebands now becomes:

(6) $$F'90 = .125 \times \frac{.2}{\sqrt{10}} + \frac{.125}{\sqrt{10}} = .0475$$

(7) $$F'150 = .125 \times \frac{.2}{\sqrt{10}} - \frac{.125}{\sqrt{10}} = .0217$$

The detected clearance sidebands are thus:
$F90 = 0.2 + 1/2 (0.0475)^2 0.20275$ (8)
$F150 = 0.2 + 1/2 (-0.0217)^2 19 = 0.20047$ (9)
and the difference depth of modulation becomes:
$DDM = 0.20225 - 0.20047 = 0.00178$ (10)
which in turn gives rise to only a 1.8 μamp course bend.

Thus, by providing a capture effect clearance antenna which produces a clearance carrier null along the course centerline as well as a sideband null, as provided by the system of the invention, a reduction in course bends by a factor of nearly three is achieved as compared to the course bends produced by conventional capture effect systems.

Figure 2:
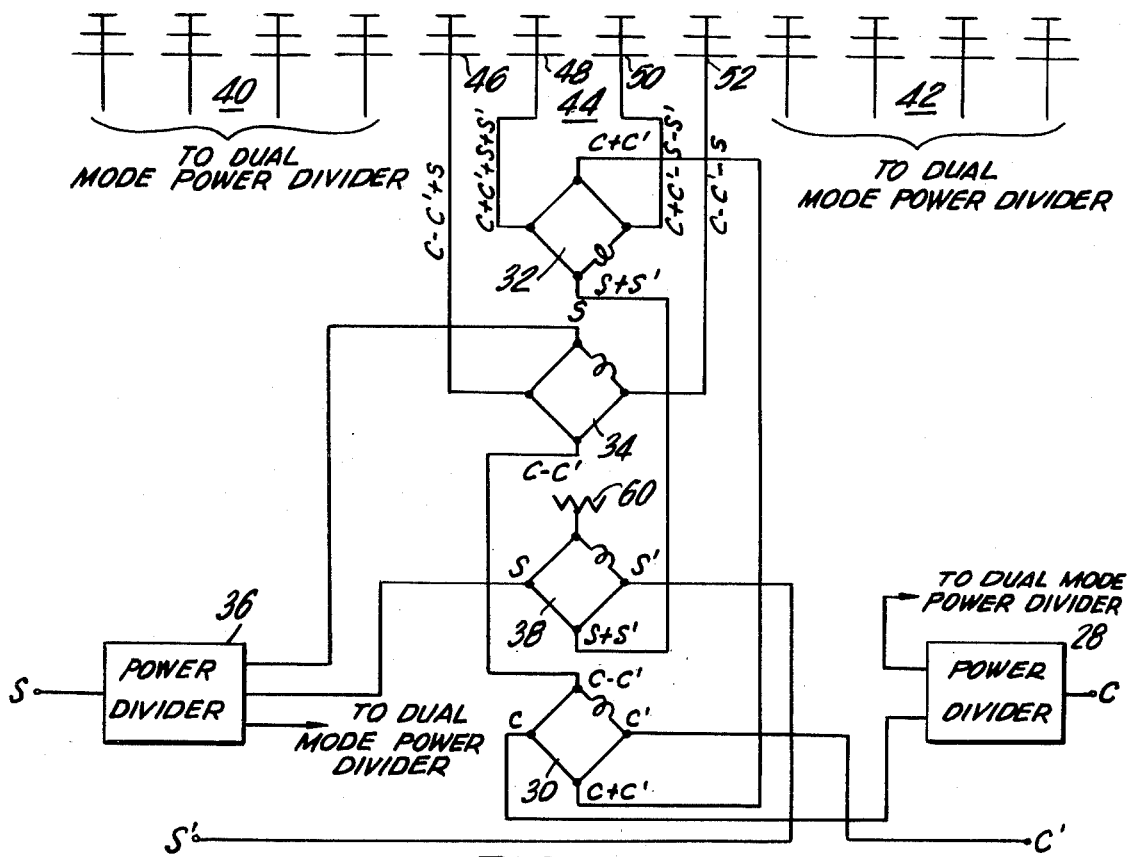
FIG. 2 is a schematic diagram of the antenna array and signal combining network according to an embodiment of the invention.

A network and antenna array capable of producing a clearance signal having the radiation pattern illustrated in FIG. 3 and which achieves the significant reductions in course bends just described is illustrated schematically in FIG. 2. Significantly, the distribution network of FIG. 2 also permits the transmission of both the course and clearance signals from a single antenna array.

In the signal combining network of FIG. 2, the course carrier signal C is applied to a power divider 28 which applies a portion of that signal to a dual mode power divider (described more completely below with reference to FIG. 4) for distribution to selected ones of the antenna array elements in a predetermined relative amplitude. Another portion of the course carrier signal is applied to one terminal of a hybrid mixer or broadband bridge 30. The other input terminal of mixer 30 receives the clearance carrier signal C'. The two outputs of mixer 30 are the sum and difference signals of the two input signals C and C'. The sum output signal C + C' is applied to one input of a hybrid mixer 32, and the difference signal C − C' is applied to one input terminal of a hybrid mixer 34.

The other input to mixer 34 receives a portion of the course sideband signal S from the output of a power divider 36 which receives at its input the course sideband power signal S. Another portion of the course sideband signal derived at the output of power divider 36 is applied to one input of a hybrid mixer 38, the other input of which receives the clearance sideband signal S'. The output sum signal S + S' of mixer 38 is applied to the other input terminal of mixer 32. The output S − S' difference signal of mixer 38 is dissipated or dumped into an impedance 60 coupled to the difference output port of that mixer. A third portion of the course sideband signal S is applied from the output of power divider 36 to the dual mode power divider.

The radiating portion of the antenna system is herein shown in the form of three groups of radiating antenna elements 40, 42 and 44. Each radiating element group consists of four radiating elements, each of which may be in the form of a bipole and reflector combination. Preferably the spacing between all adjacent antenna elements is 0.7 $\lambda$ where $\lambda$ is the wave length of the radiated signal. The antenna elements in the left-hand and right-hand groups of elements 40 and 42 each receive course carrier and sideband signals from the dual mode power divider to produce the desired course radiation pattern in a manner well known in the art and which is thus not further disclosed herein.

The radiating elements in the central group of elements 44 respectively receive energy from the outputs of the hybrid mixers representing a different sum and/or different signal of the input course and clearance carrier and sideband signals, C, S, C', and S'.

Thus, element 46 is coupled to one output of mixer 34 and receives the C+ C' + S signal, and element 48 is coupled to one output terminal of mixer 32 and receives the C + C' + S + S' signal. Similarly, radiating antenna element 50 is coupled to another output of hybrid mixer 32 and receives the C + C' − S − S' signal, and radiating antenna element 52 is coupled to an output of mixer 34 and receives the C − C' − S signal.

The resulting clearance signal including the clearance carrier and clearance sideband transmitted by the central radiating elements in group 44 has the desired radiation pattern shown in FIG. 3, in which the clearance carrier is at a null along the course centerline with the resulting reduction in the course bends, as described above.

Figure 4:
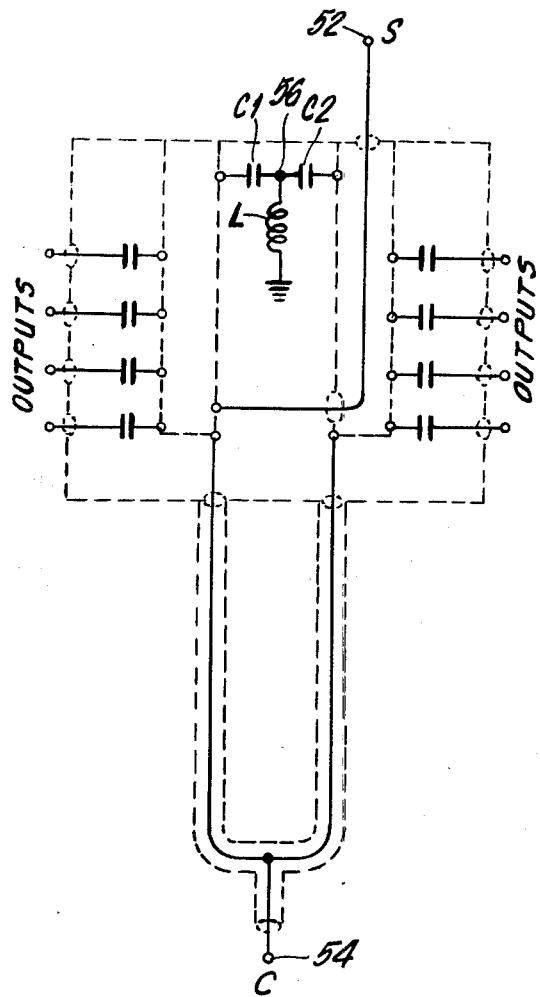
FIG. 4 is a more detailed schematic diagram of a dual mode power divider for use in the network of FIG. 2.

The dual mode power divider used to distribute the course carrier and sideband signals to the left and right groups of radiating elements according to a predetermined distribution pattern is shown in FIG. 4. Since this element of the signal distribution network of FIG. 2 is not in itself novel and is known to those skilled in the art, it will be only briefly described herein.

The dual mode power divider is basically a hybrid-type sum-difference coaxial transmission line network having a plurality of output ports. The difference input port 52 receives the course sideband signal S and feeds a two-pipe balun structure by introducing a driving voltage across the gap between the pipes to thereby produce an odd, or balanced anti-phase voltage distribution along the pipes. Simultaneously with the application of the course sideband to port 52, the course carrier signal from the output of power divider 28 is applied to the sum input port 54. The latter drives both pipes to thereby produce an even, or in phase, voltage distribution along the pipes. The balun pipes are approximately one-quarter in wavelength.

A network 56 including capacitors C1 and C2 each having a capacitance C and an inductor L connected to the junction of these capacitors, is coupled at an intermediate point along the line. As a result of the modification of the standing wave produced along the line by network 56, the difference mode sees at the tap point a capacitance C/2, the value of which may be determined to provide parallel resonance with the remaining line-section, to thereby produce an effective open circuit. The sum mode of the dual mode power divider of FIG. 4, sees, at the tap point, a capacitance 2C which is in series with the inductance L. The latter may be selected to provide series resonance to thereby produce an effective short circuit.

The dual mode power divider of FIG. 4 also includes a plurality of output taps arranged in symmetrical pairs along the sides of the divider, each pair of output taps being uniquely associated with and coupled to a corresponding radiating antenna element in element groups 40 and 42. Each output tap is coupled to the line by means of coupling capacitances as shown in FIG. 4. The choice of the position of a particular pair of output taps along the line determines the ratio of the sum-to-difference excitation required for the associated radiating element pair. The relative course signal distribution to the element pairs is determined by the relative values of the coupling capacitors respectively coupled thereto, which in turn determines the magnitude of excitation of that element pair of the odd and even distribution of element currents. The radiating elements in element groups 40 and 42 thus produce a symmetrical and narrowly directed course signal which, together with the course and clearance signal radiated by the elements in central group 44, produce the overall desired localizer radiation pattern from a single array of elements.

The capture effect antenna system of the invention thus has the ability to produce a well-defined localizer radiation pattern including both course and clearance signals from a single antenna array. The clearance carrier signal transmitted by the system has a substantial null along the course centerline which significantly, to wit, by a factor of three, reduces the course bend signal that may be generated as a result of the reflection of the clearance carrier and sideband signals from an object such as a building located adjacent the landing runway.

The capture effect system of the invention thus enables more precise instrument controlled landings. In addition, the system of the invention offers the features of increased reliability and reduced cost and complexity of equipment since a single antenna array along with four hybrid mixers and a dual mode power divider are all that is desired to produce the desired course and clearance radiation patterns. Moreover, only a relatively minor portion of the input power of the antenna system is dumped; that is, not radiated, such that the system of the invention is also extremely efficient in its utilization.

While only a single embodiment of the invention is herein specifically described, it will be appreciated that modifications may be made therein, all without departing from the spirit and scope of the invention.

I claim:

1. A capture effect antenna system for transmitting course and clearance signals along and to either side of a runway course centerline at an airfield or the like, said antenna system comprising a plurality of radiating elements, means for distributing said course signal to only a first group of said radiating elements, means for combining input course and clearance carrier and sideband signals, and means coupled to said combining means for distributing said course and clearance signals to a second group of said radiating elements and for producing a substantial transmission null of said clearance carrier signal and a maximum transmission of said course carrier along said course centerline.

2. The capture effect system of claim 1, in which said first group of radiating elements include first and second sections respectively located at each side of said second group of radiating elements.

3. The capture effect system of claim 1, in which said combining means include first mixing means receiving said course carrier signal and said clearance carrier signal, second mixing means receiving said course sideband signal and said clearance sideband signal, third mixing means having a first input coupled to the difference output of said first mixing means and a second input receiving said course sideband signal, and fourth mixing means having a first input coupled to the sum output of said second mixing means and a second input coupled to the sum output of said first mixing means.

4. The capture effect system of claim 3, in which said second group of radiating elements includes a first element coupled to the sum output of said third mixing means, a second element coupled to the sum output of said fourth mixing means, a third element coupled to the difference output of said fourth mixing means, and a fourth element coupled to the difference output of said third mixing means.

5. The capture effect system of claim 4, further including energy dissipating means coupled to the difference output of said second mixing means.

6. The capture effect system of claim 5, further including first power divider means receiving the input course carrier signal at its input and having an output supplying portions of the input course carrier signal to send first mixing means and to said first group of radiating elements, and a second power divider means receiving said course sideband signal at its input and having an output for supplying portions of said course sideband signal to said second and third mixing means and to said first group of radiating elements.

7. A method for controlling the landing of an aircraft at an airfield runway by the use of instrumentation comprising the steps of transmitting a course signal substantially along the centerline of the runway, and transmitting modulated clearance carrier and sideband signals to either side of said runway, the clearance carrier and sideband signals each being at a substantial null along said runway centerline.

* * * * *